United States Patent [19]

DeHaven

[11] 4,300,289
[45] Nov. 17, 1981

[54] HOOK FOR A MEASURING TAPE

[76] Inventor: Robert J. DeHaven, 310 N. Darlington St., West Chester, Pa. 19380

[21] Appl. No.: 153,273

[22] Filed: May 27, 1980

[51] Int. Cl.³ .............................................. G01B 3/10
[52] U.S. Cl. .................................................. 33/137 R
[58] Field of Search ................ 33/137, 138, 139, 140, 33/484

[56] References Cited

U.S. PATENT DOCUMENTS

| 2,574,272 | 11/1951 | McCully | 33/137 R |
| 3,131,480 | 5/1964 | Quenot | 33/137 |
| 3,362,075 | 1/1968 | Quenot | 33/137 R |

Primary Examiner—Harry N. Haroian

[57] ABSTRACT

A hook end for attachment to the free end of a graduated measuring tape, especially adapted to replace a broken free end.

10 Claims, 6 Drawing Figures

HOOK FOR A MEASURING TAPE

This invention is in the field of geometrical instruments; specifically, measuring tapes for determining distance, and more specifically, a hook end for such tapes.

Semi-flexible measuring tapes, which can be reeled into a small case for storage, or extended to a desirable length for making measurements, are well known and widely used by handymen and especially by workers in the building trades. The measuring tape usually has a hook at its free end, the end which first emerges from the case when the tape is extended. Graduations of distance inscribed on the top of the tape record the distance longitudinally along the tape from the free end. The tape may be curved laterally, either arched or dished, for stiffness. The hook permits the free end of the tape to be temporarily attached to a projection or edge on the object being measured, while the tape is unreeled to the point whose distance from the free end is desired.

The hook can take several forms, such as described in U.S. Pat. Nos. 2,574,272; 3,131,480; 3,362,075; and 3,611,576, for example. The hook generally is connected to the tape by means of rivets, or other fastening means which puncture the tape. The measuring tape is usually designed for determining both internal and external distances. For this capability, the hook is not firmly connected, but is adapted to slide back and forth longitudinally in relation to the tape.

The measuring tape is typically made from a metal which is relatively brittle. The punctures in the tape for connecting the hook, and the periodic twisting, flexing, and wrenching of the metal as the hook slides back and forth, and is engaged and then disengaged seriously weaken the metal. As a result, the measuring tape is often rendered useless when the hook end breaks off, usually taking part of the tape with it.

Although hooks for measuring tapes have been the subject of previous invention as disclosed above, the hooks of the prior art are not adapted to replace the part of the tape so broken from a measuring tape, but are fabricated for use in combination with an unbroken tape. None of the prior art hooks carries graduations of distance to replace those on the missing tape, for example. Therefore, prior to this invention, the owner of a hooked measuring tape unfortunate enough to break off the hook has had to replace the entire tape, at considerable expense.

Thus, it is one object of this invention to provide a hook end for attachment to the free end of a measuring tape, especially a broken tape. It is another object of this invention to provide a measuring tape having a novel hook end. In attaining these objectives, this invention provides a hook end for a graduated measuring tape having a free end which comprises (1) a hook having a projecting portion with parallel inner and outer faces and a base portion substantially perpendicular to the projecting portion; (2) a measuring plate having a top, a bottom, and parallel leading and trailing edges, the top of said measuring plate carrying graduations of the distance along its length from the leading edge to the trailing edge, the base portion of said hook slidably connected to said measuring plate, with the projecting portion depending beneath the bottom, for longitudinal movement relative to said measuring plate between a retracted position wherein the outer face of the projecting portion is aligned with the leading edge, and an extended position wherein the inner face of the projecting portion is aligned with the leading edge; (3) together with means for attaching said measuring plate to the free end of a graduated measuring tape with the graduations on the top of said measuring plate overlapping and coinciding with the corresponding graduations on said measuring tape.

Various advantages and novel features which characterize this invention are particularly pointed out in the appended claims. However, for a better understanding of the invention, its advantages, and the objectives to be attained by its use, reference should be made to the drawings, which illustrate a preferred embodiment containing optional features, and to the following description.

Figure 6:
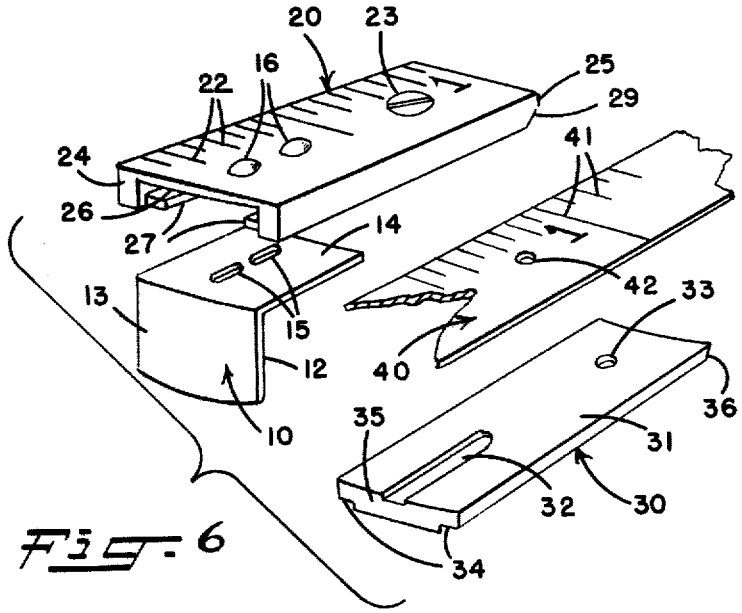
FIG. 6 is an exploded view of the hook end of FIG. 1 which, in addition, shows the relative placement of the free end of a measuring tape whose broken hook end is to be replaced by the hook end of this invention.

Referring first to FIG. 6, the hook end of this invention comprises hook 10, which connects to measuring plate 20, together with means, of which retainer plate 30 may be a part, to attach said measuring plate to free end 40 of a measuring tape.

Figure 1:
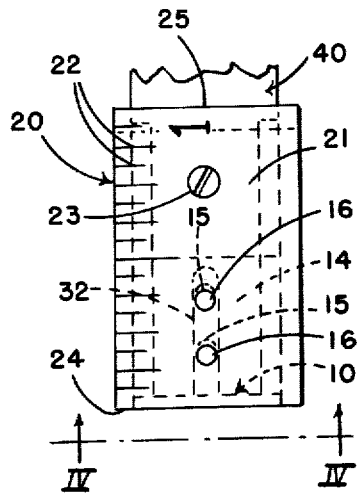
FIG. 1 is the top plan view of a hook end according to this invention and shows the hook in the retracted position.
Figure 2:
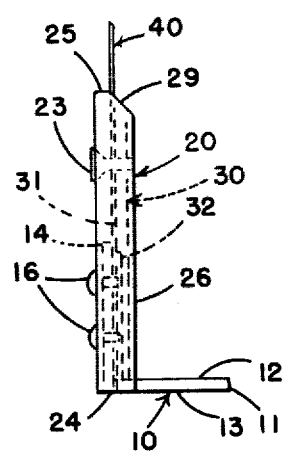
FIG. 2 is the side view of the hook end of FIG. 1.
Figure 3:
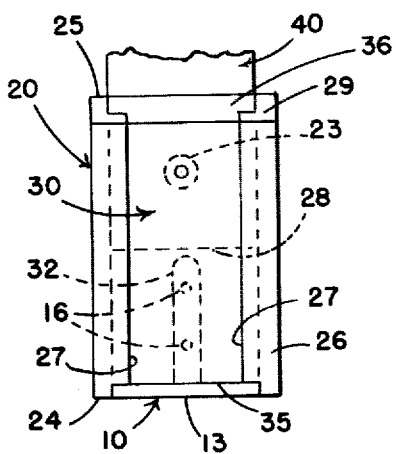
FIG. 3 is the bottom view of the hook end of FIG. 1.
Figure 4:
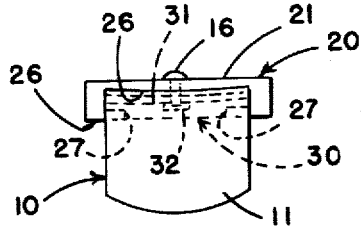
FIG. 4 is the end view of the hook end of FIG. 1 taken along line IV—IV.
Figure 5:
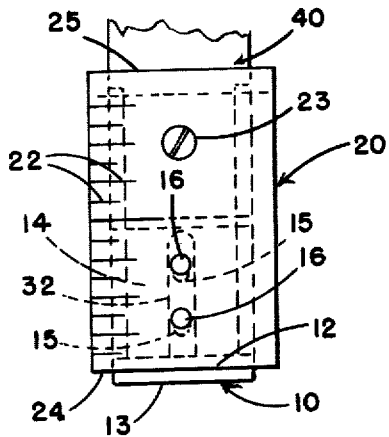
FIG. 5 is the top plan view of the hook end of FIG. 1, but shows the hook end in the extended position and omits showing the graduations of distance for purposes of clarity.

Hook 10 has projecting portion 11 with inner face 12 and outer face 13, the two faces being substantially parallel. Base portion 14 of hook 10 is substantially perpendicular to the projecting portion and advantageously includes at least one elongated slot 15, which may be utilized as described below in slidably connecting hook 10 to measuring plate 20. When the hook end is attached to the free end of a measuring tape, the hook will generally be in the extended position shown in FIG. 5 when an external distance is sought, and inner face 12 will contact the object being measured; the hook will generally be retracted as shown in FIG. 1 when an internal distance is sought, and outer face 13 will contact the object.

Hook 10 may be slidably connected to measuring plate 20 in several ways for longitudinal movement perpendicular to leading edge 24 of the measuring plate, but base portion 14 will generally be connected at bottom 26 of the measuring plate, with projecting portion 11 depending beneath bottom 26, as shown in Figures. It is preferred to employ at least one penetrating fastener passing through measuring plate 20 and base portion 14. For purposes herein, penetrating fasteners are those which attach one object to another by either passing through or penetrating both objects; such fasteners include, for example, bolts with associated nuts, rivets, screws, including self-tapping screws, pins, and nails, all having shanks of given diameters. Two such fasteners, such as rivets 16, provide good connection of base portion 14 to measuring plate 20, and rivets, bolts, or a combination thereof are especially effective. Connection of base portion 14 at top 21 of the measuring plate is also possible, but less desirable in that graduations of distance 22, which appear on top 21, should be visible and unobstructed.

However it is connected to measuring plate 20, hook 10 is connected for longitudinal movement perpendicular to leading edge 24 as described above. When a penetrating fastener of given shank diameter is employed, base portion 14 advantageously has a corresponding slot 15 to pass the penetrating fastener, the slot being longer in the longitudinal direction of the measuring plate than the shank diameter by the distance between inner face 12 and outer face 13 of projecting portion 11, thus providing for the longitudinal movement.

When the hook end of this invention is adapted for attachment to the free end of a measuring tape by passing free end 40 beneath base portion 14, it is desirable to minimize interference by the tape with free movement of the hook. If the measuring tape is curved laterally and will otherwise interfere with free movement of the hook, it is desirable that base portion 14 be curved laterally to conform thereto. Alternately or in addition, when base portion 14 is connected at bottom 26 of the measuring plate, recessed step 28 is conveniently provided in bottom 26 to receive base portion 14.

The hook end of this invention carries means to attach measuring plate 20 to the free end of a measuring tape, the attachment being made so that graduations of distance 41 on the graduated side of the measuring tape and graduations of distance 22 on the top of the measuring plate overlap, coincide, and are in alignment, e.g., at the "1 inch" graduation, at trailing edge 25 of the measuring plate. To effect this, the length of the measuring plate, the distance between leading edge 24 and trailing edge 25, preferably corresponds to a major graduation, such as one inch, but neither the length nor the width of the measuring plate are critical. Provision of graduations of distance 22 and for alignment at trailing edge 25 allows the hook end of this invention to readily replace the broken free end of a measuring tape.

A number of means are available for so attaching measuring plate 20 to free end 40. Various adhesives, e.g., epoxy resins, can be used, and various fasteners, e.g., penetrating fasteners, as defined above, clips, clamps, etc. can be employed. When base portion 14 is connected at bottom 26 of the measuring plate, it is convenient and preferred to also attach a tape free end with the graduated side of the measuring tape contacting bottom 26. A preferred attachment means in that case is to provide a second penetrating fastener, e.g., a bolt, rivet, or, preferably, a self-tapping screw 23 to pass through both the measuring plate and a measuring tape, e.g., by providing free end 40 with hole 42. It is also preferred that bottom 26 be curved laterally if the measuring tape to be attached is so curved, so as to conform thereto.

To impart further strength and integrity when base portion 14 is connected at bottom 26, and means are provided to attach a measuring tape at bottom 26, it is desirable to also provide a retainer plate having an upper surface to contact the side of an attached measuring tape opposite the graduated side, a leading edge, a trailing edge, and secured by at least one of the penetrating fasteners; e.g., by passing self tapping screw 23 through a hole 33 provided in the retainer plate. The retainer plate covers the exposed underside of hook base portion 14, the underside of a tape free end, or both. Although separate retainer plates can be provided, it is preferred that retainer plate 30 be employed, which extends under both base portion 14 and a tape free end 40, leading edge 35 of the retainer plate being aligned with inner face 12 of projecting portion 11 with hook 10 in the retracted position. Preferably, trailing edge 36 of the retainer plate is also aligned with trailing edge 25 of the measuring plate. It is also preferred that the retainer plate, e.g., upper surface 31, be curved laterally, if the measuring tape is curved, so as to conform thereto. It is also desirable to provide routed recession 32 in upper surface 31 to clear the end of any penetrating fastener 16.

In addition, it is advantageous to provide the measuring plate with a longitudinal rabbet for engagement with a complementary longitudinal rabbet in the retainer plate. For example, bottom 26 can be channeled with longitudinal tongues 27, which mate with complementary longitudinal grooves 34 in retainer plate 30.

To minimize the possibility that the hook free end will catch on an object to be measured at a point other than hook projecting portion 11, it is desirable to provide bevel 29 on trailing edge 25 of the measuring plate and on trailing edge 36 of the retainer plate, the trailing edges being in alignment along the bevel.

A number of materials can be employed for the hook end of this invention, the choice of material being dictated by the strength and servicability desired and the ease of fabrication. Hook 10 can be made of metal and measuring plate 20 and retainer plate 30 of wood, metal, or plastic, for example.

The hook end of this invention adds a certain amount of bulk to the free end of a measuring tape. Whereas it is desirable to minimize the bulk by an appropriate choice of dimensions and materials, the hook end provided herein prevents the free end of a measuring tape from reeling completely into a carrying case, thereby providing a convenient finger grip when extending the tape to make a measurement, as well as affording a convenient ruler for measuring short distances.

It will be apparent that a number of modifications and variations in the details of this invention can be made, while remaining within the scope of the following claims.

What is claimed is:

1. A hook end for a graduated measuring tape having a free end which comprises a hook having a projecting portion with parallel inner and outer faces and a base portion substantially perpendicular to the projecting portion;

a measuring plate having a top, a bottom, and parallel leading and trailing edges, the top of said measuring plate carrying graduations of the distance along its length from the leading edge to the trailing edge, the base portion of said hook slidably connected to said measuring plate, with the projecting portion depending beneath the bottom, for longitudinal movement relative to said measuring plate between a retracted position wherein the outer face of the projecting portion is aligned with the leading edge, and an extended position wherein the inner face of the projecting portion is aligned with the leading edge;

together with means for attaching said measuring plate to the free end of a graduated measuring tape with the graduations on the top of said measuring plate overlapping and coinciding with the corresponding graduations on said measuring tape.

2. The hook end of claim 1 wherein the base portion of said hook is slidably connected at the bottom of said measuring plate by a first penetrating fastener of a given shank diameter passing through said measuring plate and the base portion, the base portion having a slot to pass the penetrating fastener, the slot being longer in the longitudinal direction of said measuring plate than the shank diameter by the distance separating the inner and outer faces of the projecting portion.

3. The hook end of claim 2 wherein the bottom of said measuring plate has a recessed step to receive the base portion of said hook.

4. The hook end of claim 3 wherein said means to attach said measuring plate to the free end of a measuring tape comprises a second penetrating fastener to pass through both said measuring plate and a measuring tape to be attached with the graduated side of the measuring tape contacting the bottom of said measuring plate.

5. The hook end of claim 4 wherein said attachment means further comprises a retainer plate having an upper surface to contact the side of an attached measuring tape opposite the graduated side, a lower surface, a leading edge, a trailing edge, and secured by at least one of the penetrating fasteners.

6. The hook end of claim 5 wherein the leading edge of said retainer plate is aligned with the inner face of the projecting portion with said hook in the retracted position, and the upper surface of said retainer plate has a routed recession to clear the first penetrating fastener.

7. The hook end of claim 6 wherein said measuring plate and said retainer plate carry complementary tongues and grooves for engagement.

8. The hook end of claim 7 wherein the bottom of said measuring plate and the upper surface of said retainer plate are curved laterally to conform to the lateral curve in a measuring tape.

9. The hook end of claim 8 wherein the trailing edge of said measuring plate and the trailing edge of said retainer plate are aligned along a bevel.

10. A graduated measuring tape having a hooked free end which comprises in combination a semi-flexible measuring tape having a free end and graduations of distance from said free end;

a hook having a projecting portion with parallel inner and outer faces and a base portion substantially perpendicular to the projecting portion;

a measuring plate having a top, a bottom, and parallel leading and trailing edges, the top of said measuring plate carrying graduations of the distance along its length from the leading edge to the trailing edge, the base portion of said hook slidably connected to said measuring plate, with the projecting portion depending beneath the bottom, for longitudinal movement relative to said measuring plate between a retracted position wherein the outer face of the projecting portion if aligned with the leading edge, and an extended position wherein the inner face of the projecting portion is aligned with the leading edge;

means for attaching said measuring plate to the free end of said graduated measuring tape with the graduations on the top of said measuring plate overlapping and coinciding with the corresponding graduations on said measuring tape; and a case into which said measuring tape can be reeled for storage.

* * * * *